United States Patent
Kaihara

(10) Patent No.: US 11,643,516 B2
(45) Date of Patent: May 9, 2023

(54) CATION EXCHANGE MEMBRANE, FLUORINE-CONTAINING POLYMER, METHOD FOR PRODUCING FLUORINE-CONTAINING POLYMER, AND ELECTROLYZER

(71) Applicant: ASAHI KASEI KABUSHIKI KAISHA, Tokyo (JP)

(72) Inventor: Shinichi Kaihara, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 620 days.

(21) Appl. No.: 16/720,614

(22) Filed: Dec. 19, 2019

(65) Prior Publication Data
US 2020/0199315 A1 Jun. 25, 2020

(30) Foreign Application Priority Data

Dec. 21, 2018 (JP) .............................. JP2018-240146
Dec. 2, 2019 (JP) .............................. JP2019-218014

(51) Int. Cl.
*C08J 5/22* (2006.01)
*C25B 13/08* (2006.01)
*C25B 9/23* (2021.01)

(52) U.S. Cl.
CPC ............... *C08J 5/2243* (2013.01); *C25B 9/23* (2021.01); *C25B 13/08* (2013.01); *C08J 2327/18* (2013.01)

(58) Field of Classification Search
CPC ..... C08J 5/2243; C08J 2327/18; C25B 13/08; C25B 9/23

USPC .......................................................... 521/38
See application file for complete search history.

(56) References Cited

U.S. PATENT DOCUMENTS

| | | | |
|---|---|---|---|
| 4,348,310 A | 9/1982 | Silva et al. | |
| 4,604,172 A * | 8/1986 | Hengel | ..................... C08J 5/225 205/535 |
| 8,377,998 B2 * | 2/2013 | Tomita | ................ C08F 214/182 521/38 |
| 2011/0015283 A1* | 1/2011 | Tomita | ................ C08F 214/182 521/38 |
| 2016/0130710 A1* | 5/2016 | Kaihara | ................ C08J 5/2237 204/252 |

FOREIGN PATENT DOCUMENTS

| CN | 1036606 A | 10/1989 |
|---|---|---|
| CN | 105308217 A | 2/2016 |

(Continued)

*Primary Examiner* — Michael M. Bernshteyn
(74) *Attorney, Agent, or Firm* — Greenblum & Bernstein, P.L.C.

(57) ABSTRACT

A fluorine-containing polymer achieving both low resistivity and high thermal stability, which have been conventionally conflicting, a cation exchange membrane including the fluorine-containing polymer, and an electrolyzer including the cation exchange membrane. The cation exchange membrane including: the fluorine-containing polymer, which includes: a tetrafluoroethylene unit (A); and a perfluoroethylene unit (B) having a carboxylic acid-type ion exchange group, where the fluorine-containing polymer has a main-chain terminal structure (T) represented by the following formula (1):

$$-(C_mF_nH_{2m-n})-OH \qquad (1)$$

in which m and n each represent any integer satisfying $m \geq 2$, $n \geq 0$, and $2m-n \geq 1$.

13 Claims, 1 Drawing Sheet

(56) References Cited

FOREIGN PATENT DOCUMENTS

| | | |
|---|---|---|
| EP | 0271243 | 6/1988 |
| EP | 0327313 A | 8/1989 |
| JP | 63-150308 | 6/1988 |

\* cited by examiner

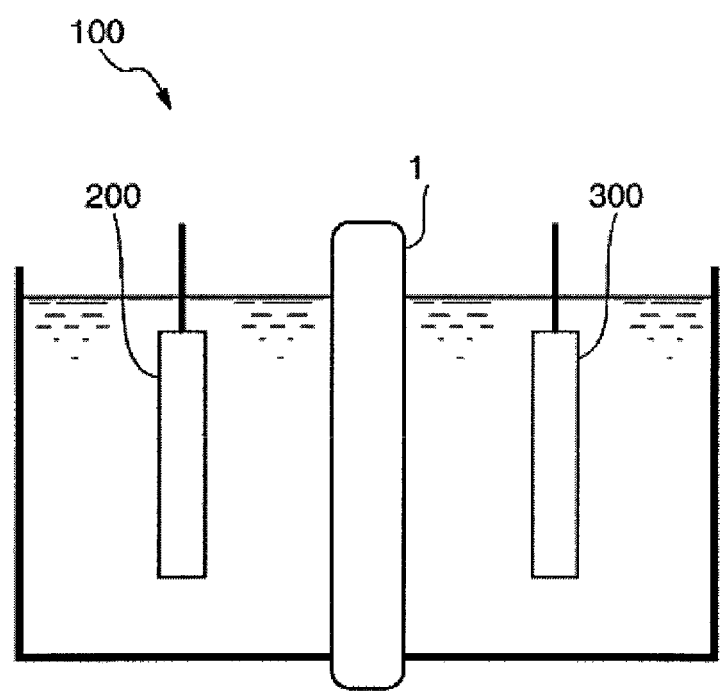

CATION EXCHANGE MEMBRANE, FLUORINE-CONTAINING POLYMER, METHOD FOR PRODUCING FLUORINE-CONTAINING POLYMER, AND ELECTROLYZER

TECHNICAL FIELD

The present invention relates to a cation exchange membrane, a fluorine-containing polymer, a method for producing a fluorine-containing polymer, and an electrolyzer.

BACKGROUND ART

Fluorine-containing ion exchange membranes, which are excellent in heat resistance and chemical resistance, are used as cation exchange membranes for electrolysis to produce chloride and alkali in electrolysis of alkali chloride and also as membranes for ozone production and various electrolytic membrane for fuel cells, water electrolysis, hydrochloric acid electrolysis, and the like. Among these, in electrolysis of alkali chloride, required are high current efficiency from the viewpoint of productivity, a low electrolytic voltage from the viewpoint of economic efficiency, and a low salt concentration in caustic soda from the viewpoint of quality of products.

Among the requirements described above, in order to develop high current efficiency, generally used is an ion exchange membrane composed of at least two layers: a carboxylic acid layer containing a carboxylic acid group having a high anion exclusion property as an ion exchange group and a sulfonic acid layer containing a low resistant sulfonic acid group as an ion exchange group. Among these, as the carboxylic acid layer, generally used is a layer obtained by melting and membrane-forming a fluorine-containing polymer having a carboxylic acid-type ion exchange group precursor by an coextrusion T die method or the like and converting (hydrolyzing) the carboxylic acid-type ion exchange group precursor into an ion exchange group. For the fluorine-containing polymer having a carboxylic acid-type ion exchange group precursor, methanol is generally used as a chain transfer agent for molecular weight adjustment in the production step therefor.

However, a fluorine-containing polymer produced by using methanol as the chain transfer agent, which has an unstable —CH$_2$OH structure in the main chain terminal of the polymer, has problems such as low thermal stability and occurrence of unevenness on membrane formation. For this reason, attempts have been made to alter the structure of the main chain terminal of the polymer to improve the thermal stability.

For example, Patent Literature 1 discloses a technique to produce a fluorine-containing polymer using methane, ethane, or propane as the chain transfer agent in order to alter the —CH$_2$OH structure in the main chain terminal of the polymer to thereby improve the thermal stability.

CITATION LIST

Patent Literature

[Patent Literature 1] Japanese Unexamined Patent Publication No. 63-150308

SUMMARY OF INVENTION

Technical Problem

However, the technique disclosed in Patent Literature 1 has the following problem: in the case of using propane or the like as the chain transfer agent, the resistivity becomes higher to result in a higher electrolytic voltage when forming a produced fluorine-containing polymer into a membrane.

The present invention has been conceived in view of the problems of the conventional art described above, and a primary object of the present invention is to provide a fluorine-containing polymer achieving both low resistivity and high thermal stability, which have been conventionally conflicting, a cation exchange membrane containing the fluorine-containing polymer, and an electrolyzer comprising the cation exchange membrane.

Solution to Problem

As a result of having conducted diligent research to solve the above problems, the present inventors have found that the above problem can be solved by using a specific fluorine-containing polymer containing a tetrafluoroethylene unit and a perfluoroethylene unit having a carboxylic acid-type ion exchange group, having accomplished the present invention.

That is to say, the present invention is as set forth below.

[1]
A cation exchange membrane comprising:
a fluorine-containing polymer comprising a tetrafluoroethylene unit (A) and a perfluoroethylene unit (B) having a carboxylic acid-type ion exchange group,
wherein the fluorine-containing polymer has a main-chain terminal structure (T) represented by the following formula (1):

wherein m and n each represent any integer satisfying m≥2, n≥0, and 2m−n≥1.

[2]
The cation exchange membrane according to [1], wherein the perfluoroethylene unit (B) comprises a unit (B1) represented by the following formula (2):

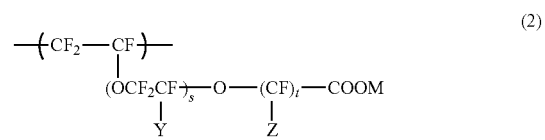

wherein s represents an integer of 0 to 2, t represents an integer of 1 to 12, Y and Z each independently represent F or CF$_3$, and M represents an alkali metal.

[3]
A fluorine-containing polymer comprising:
a tetrafluoroethylene unit (A); and
a perfluoroethylene unit (b) having a carboxylic acid-type ion exchange group precursor,
wherein the fluorine-containing polymer has a main-chain terminal structure (T) represented by the following formula (1):

wherein m and n each represent any integer satisfying m≥2, n≥0, and 2m−n≥1.

[4]
The fluorine-containing polymer according to [3], wherein the perfluoroethylene unit (b) having the carboxylic acid-type ion exchange group precursor comprises a unit (b1) represented by the following formula (3):

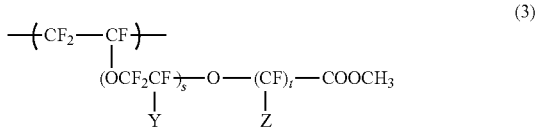 (3)

wherein s represents an integer of 0 to 2, t represents an integer of 1 to 12, and Y and Z each independently represent F or CF$_3$.

[5]

A method for producing the fluorine-containing polymer according to [3] or [4], comprising performing a polymerization using a chain transfer agent comprising an alcohol represented by the following formula (4):

 (4)

$C_mF_nH_{2m+1-n}OH$ wherein m and n each represent any integer satisfying m≥2, n≥0, and 2m+1−n≥1.

[6]

The method for producing the fluorine-containing polymer according to [5], wherein the alcohol comprises at least one selected from the group consisting of ethanol, n-propanol, and 2-propanol.

[7]

A cation exchange membrane comprising a hydrolysate of the fluorine-containing polymer according to [3] or [4].

[8]

An electrolyzer comprising:
an anode;
a cathode; and
the cation exchange membrane according to any one of [1], [2], and [7] disposed between the anode and the cathode.

Advantageous Effects of Invention

According to the present invention, it is possible to provide a fluorine-containing polymer having low resistivity and high thermal stability, a cation exchange membrane containing the fluorine-containing polymer, and an electrolyzer including the cation exchange membrane.

BRIEF DESCRIPTION OF DRAWINGS

FIG. 1 shows a schematic cross-sectional view showing one example of an electrolyzer according to an aspect of the present embodiment.

DESCRIPTION OF EMBODIMENT

Hereinbelow, an embodiment for carrying out the present invention (hereinafter referred to as "the present embodiment") will now be described in detail. The present invention is not limited to the present embodiment below, and can be carried out after making various modifications within the scope of the gist of the present invention.

[Cation Exchange Membrane]

A cation exchange membrane of the present embodiment comprises a fluorine-containing polymer comprising a tetrafluoroethylene unit (A) and a perfluoroethylene unit (B) having a carboxylic acid-type ion exchange group, wherein the fluorine-containing polymer has a predetermined main-chain terminal structure (T).

The fluorine-containing polymer contained in the cation exchange membrane of the present embodiment can be identified with the hydrolyzed structure of the fluorine-containing polymer of the present embodiment mentioned below.

(Fluorine-Containing Polymer)

The fluorine-containing polymer of the present embodiment comprises a tetrafluoroethylene unit (A) and a perfluoroethylene unit (b) having a carboxylic acid-type ion exchange group precursor and has a main-chain terminal structure (T) represented by the following formula (1):

 (1)

wherein m and n each represent any integer satisfying m≥2, n≥0, and 2m−n≥1.

Being configured as described above, when the fluorine-containing polymer of the present embodiment is used as a material for the cation exchange membrane, the cation exchange membrane will have low resistivity and high thermal stability.

From the viewpoint of preventing deterioration on electrolysis, m and n preferably satisfies 2≤m≤5, 0≤n≤9, and 1≤2m−n≤10.

The fluorine-containing polymer means a fluorine-containing polymer having an ion exchange group or a fluorine-containing polymer having an ion exchange group precursor that may become an ion exchange group by hydrolysis. The cation exchange membrane of the present embodiment may include a fluorine-containing polymer having an ion exchange group precursor that may become an ion exchange group by hydrolysis as described above, in addition to the fluorine-containing polymer having an ion exchange group.

Examples of the fluorine-containing polymer having an ion exchange group precursor that may become an ion exchange group by hydrolysis include, but are not limited to, polymers comprising a fluorinated hydrocarbon main chain, having, as a side chain, a functional group that can be converted into an ion exchange group by hydrolysis or the like, and being easily melt-processable.

Generally, examples of a perfluoro monomer include, but are not limited to, perfluoro monomers selected from the group consisting of tetrafluoroethylene, hexafluoropropylene, and perfluoro(alkylvinylether). Among these, tetrafluoroethylene is used to introduce the tetrafluoroethylene unit (A) into the fluorine-containing polymer of the present embodiment.

A perfluorovinyl compound having a functional group that may be converted into a carboxylic acid group (carboxylic acid-type ion exchange group) is used to introduce the perfluoroethylene unit (b) having a carboxylic acid-type ion exchange group precursor into the fluorine-containing polymer of the present embodiment. Examples of such a perfluorovinyl compound include, but are not limited to, monomers represented by $CF_2=CF(OCF_2CYF)_s—O(CZF)_t—COOR$.

wherein s represents an integer of 0 to 2, t represents an integer of 1 to 12, Y and Z each independently represent F or CF$_3$, and R represents a lower alkyl group.

Examples of the lower alkyl group include, but are not particularly limited to, alkyl groups having 5 or less carbon atoms. The carboxylic acid-type ion exchange group precursor herein refers to a functional group that may be converted into a carboxylic acid group (carboxylic acid-type ion exchange group).

Among these perfluorovinyl compounds, compounds represented by $CF_2=CF(OCF_2CYF)_n—O(CF_2)_m—COOR$ are preferred.

wherein n represents an integer of 0 to 2, m represents an integer of 1 to 4, Y represents F or $CF_3$, and R represents $CH_3$, $C_2H_5$, or $C_3H_7$.

Particularly, when a cation exchange membrane containing the fluorine-containing polymer of the present embodiment is used as a cation exchange membrane for alkali electrolysis, at least a perfluoro compound is preferably used as a monomer on producing the fluorine-containing polymer of the present embodiment. However, the alkyl group in the ester group (see R described above) is removed from the polymer on hydrolysis, and thus, the alkyl group (R) described above may not necessarily be a perfluoroalkyl group in which all the hydrogen atoms are replaced by fluorine atoms.

Specific examples thereof include, but are not limited to, monomers shown below:
$CF_2=CFOCF_2CF(CF_3)OCF_2COOCH_3$,
$CF_2=CFOCF_2CF(CF_3)O(CF_2)_2COOCH_3$,
$CF_2=CF[OCF_2CF(CF_3)]_2O(CF_2)_2COOCH_3$,
$CF_2=CFOCF_2CF(CF_3)O(CF_2)_3COOCH_3$,
$CF_2=CFO(CF_2)_2COOCH_3$, and
$CF_2=CFO(CF_2)_3COOCH_3$ Among these, $CF_2=CFOCF_2CF(CF_3)O(CF_2)_2COOCH_3$ is more preferred.

The perfluoroethylene unit (b) having a carboxylic acid-type ion exchange group precursor contained in the fluorine-containing polymer of the present embodiment may be a unit derived from the perfluoro compound exemplified above, and preferably includes a unit (b1) represented by the following formula (3), from the viewpoint of improving the electrolytic characteristics of the cation exchange membrane of the present embodiment:

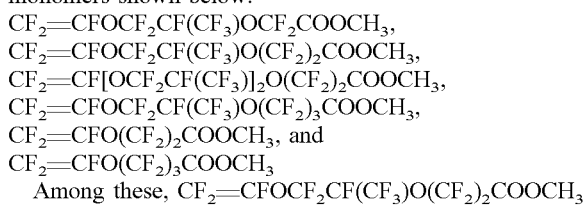

(3)

wherein s represents an integer of 0 to 2, t represents an integer of 1 to 12, and Y and Z each independently represent F or $CF_3$.

(Method for Producing Fluorine-Containing Polymer)

The fluorine-containing polymer of the present embodiment can be obtained by polymerizing, for example, tetrafluoroethylene with a monomer corresponding to the perfluoroethylene unit (b) having a carboxylic acid-type ion exchange group precursor.

The fluorine-containing polymer of the present embodiment can be produced by various known polymerization methods developed for homopolymerization and copolymerization of fluorinated ethylene. Examples of the polymerization method include, but are not particularly limited to, a bulk polymerization method, a solution polymerization method, a suspension polymerization method, and an emulsion polymerization method, and a solution polymerization method is preferred.

As a polymerization solvent in the solution polymerization method, various known fluorine-containing solvents can be used. Examples of the polymerization solvent include, but are not limited to, inert fluorine-containing solvents such as $CF_2ClCFCl_2$ (CFC113), $CClF_2CF_2CFHCl$ (HCFC225cb), $CF_3CHFCHFCF_2CF_3$ (HFC43-10mee), perfluoromethylcyclohexane, perfluorodimethylcyclobutane, perfluorooctane, and perfluorobenzene, and hydrofluorocarbon-based solvents are more preferred.

Examples of a polymerization initiator for use in polymerization of the fluorine-containing polymer of the present embodiment include, but are not limited to, oil-soluble polymerization initiators including azo compounds such as azobisisobutyronitrile, diacyl peroxides such as benzoyl peroxide and dipentafluoropropionyl peroxide, peroxyesters such as t-butyl peroxyisobutyrate, and hydroperoxides such as diisopropylbenzene hydroperoxide, and diacyl peroxides are preferred.

The molecular weight and main-chain terminal structure of the fluorine-containing polymer of the present embodiment can be adjusted by using a chain transfer agent on polymerization.

Suitable examples of the chain transfer agent for use in polymerization of the fluorine-containing polymer of the present embodiment include alcohols represented by the following formula (4).

In other words, the fluorine-containing polymer of the present embodiment is preferably one obtained by performing polymerization using at least an alcohol represented by the following formula (4).

The method for producing the fluorine-containing polymer of the present embodiment also preferably include a step of performing polymerization using a chain transfer agent containing an alcohol represented by the following formula (4):

$$C_mF_nH_{2m+1-n}OH \quad (4)$$

wherein m and n each represent any integer satisfying m≥2, n≥0, and 2m+1−n≥1.

Among the alcohols described above, when the number of carbon atoms and hydrogen atoms are excessive, many hydrocarbon structures susceptible to deterioration during electrolysis are contained in the main chain terminal derived from the chain transfer agent. From the viewpoint of preventing deterioration of the fluorine-containing polymer during electrolysis, preferred are chain transfer agents in which m and n are any integer satisfying 2≤m≤5, 0≤n≤10, and 1≤2m+1−n≤11 in the above formula (4). From the similar viewpoint, the chain transfer agent is more preferably at least one selected from the group consisting of ethanol, n-propanol, and 2-propanol.

The main-chain terminal structure of the fluorine-containing polymer depends on types of the chain transfer agent.

For example, when methanol is used as the chain transfer agent, a —$CH_2OH$ terminal derived from methanol is generated.

When the alcohol described above is used as the chain transfer agent, the main-chain terminal structure will be a main-chain terminal structure (T) represented by the above formula (1). For example, when ethanol is used, a —$CH_2CH_2OH$ terminal or a —$CH(CH_3)OH$ terminal is generated.

Meanwhile, when an alkane is used as the chain transfer agent, no main-chain terminal structure (T) in the present embodiment is obtained, and a terminal having no hydroxyl group, such as a —$CH_3$ terminal, is generated.

The thermal stability of the fluorine-containing polymer may be affected by its main-chain terminal structure.

For example, when the main-chain terminal structure has a —$CH_2OH$ terminal, the —$CH_2OH$ terminal, when subjected to heat hysteresis, changes into an unstable —COF terminal due to oxidation. This —COF terminal and the —$CH_2OH$ terminal in the fluorine-containing polymer cause an esterification reaction to thereby increase the molecular weight. When the fluorine-containing polymer has an ester group, the —CH$_2$OH terminal and the ester group cause a transesterification reaction also to thereby increase the molecular weight.

Meanwhile, the main-chain terminal structure (T) represented by the above formula (1), that is, a terminal generated when the alcohol described above is used as the chain transfer agent (e.g., —CH(CH$_3$)OH or the like) is unlikely to cause an oxidation reaction, and a transesterification reaction is also suppressed by steric hindrance. Thus, the fluorine-containing polymer of the present embodiment is stable to heat.

In a step of polymerizing the fluorine-containing polymer, the polymerization reaction can be performed under a condition of a polymerization pressure of 0.01 MPa to 20 MPa, for example, preferably 0.03 to 10 MPa. A pressure set to 0.01 MPa or more is industrially preferred because a sufficient polymerization rate is achieved, and a pressure set to 20 MPa or less is preferred because the polymerization of the perfluoro monomer can be suppressed.

Conditions other than the polymerization pressure and operation are not particularly limited, and reaction conditions of a broad range can be employed. For example, the polymerization reaction can be performed under a condition of a polymerization temperature of 0 to 200° C., preferably 10° C. to 90° C. A temperature set to 0° C. or more is industrially preferred because a sufficient polymerization rate is achieved, and a temperature set to 200° C. or less is preferred because the polymerization of the perfluoro monomer can be suppressed.

In the step of polymerizing the fluorine-containing polymer of the present embodiment, it is preferred that the molecular weight be adjusted not only by the amount of the polymerization initiator to be added but also by adding a chain transfer agent in addition to the polymerization initiator.

The use of the polymerization initiator in combination with the chain transfer agent is preferred because a fluorine-containing polymer having a smaller molecular weight distribution can be obtained than when the molecular weight is adjusted with the polymerization initiator alone.

In the step of polymerizing the fluorine-containing polymer of the present embodiment, the amount of the chain transfer agent to be added can be appropriately adjusted depending on the type of the chain transfer agent and is not particularly limited. However, the chain transfer agent is preferably added in an amount of 0.00001% to 10% and more preferably in an amount of 0.0001% to 10%, based on the mass of the liquid fed. From the viewpoint of further narrowing the molecular weight distribution, the chain transfer agent is preferably added in a plurality of portions. A narrow molecular weight distribution of the fluorine-containing polymer is preferred from the viewpoint of developing the long-term stability of the current efficiency.

In the step of polymerizing the fluorine-containing polymer of the present embodiment, it is preferred to use a polymerization terminator on terminating the polymerization.

As the polymerization terminator, a polymerization terminator which is known and used can be used. However, from the viewpoint that the thermal stability of a fluorine-containing polymer can be improved by stabilizing the —COF terminal of the fluorine-containing polymer to be generated during polymerization, an alcohol is preferably used as the polymerization terminator, and methanol, ethanol, n-propanol, and 2-propanol are more preferred.

In a step of producing the fluorine-containing polymer of the present embodiment, the fluorine-containing polymer is preferably collected by evaporating off the unreacted perfluorovinyl compound and polymerization solvent by means of heating and pressure reduction of the polymerization liquid.

Such a collection method may facilitate effective collection of the unreacted perfluorovinyl compound and polymerization solvent from the polymerization liquid, in comparison with an aggregation separation method or the like.

(Physical Properties of Fluorine-Containing Polymer)

The EW (equivalent weight) of the fluorine-containing polymer of the present embodiment is preferably 500 to 2000 g/eq. and more preferably 800 to 1700 g/eq. From the viewpoint that the molar ratio between the unit (A) and the unit (B) falls in a more suitable range and consequently the electrolytic characteristics are improved, EW is even more preferably 900 to 1400 g/eq. and still more preferably 1100 to 1300 g/eq.

Here the EW is the equivalent weight of the fluorine-containing polymer [g–copolymer composition/eq.–functional group] (unit: g/eq.).

When the EW is 500 or more, the current efficiency tends to increase, and when EW is 2000 or less, the electrolytic voltage tends to be reduced.

The EW can be determined by neutralization titration or the like.

The EW can be adjusted to fall within the above range by adjusting the molar ratio of each unit in the fluorine-containing polymer of the present embodiment or the like.

When the melt index (MI) (unit: g/10 minutes) of the fluorine-containing polymer of the present embodiment measured under conditions of a temperature of 270° C., a load of 2.16 kg, and an orifice inner diameter of 2.09 mm, in accordance with JIS K-7210, is taken as a, a is preferably 3 to 50, more preferably 4 to 30, and even more preferably 5 to 20.

When a is 3 or more, it is not necessary to excessively raise the temperature on membrane formation, and it is possible to prevent deterioration of the fluorine-containing polymer. When a is 50 or less, it is possible to prevent a reduction in the membrane strength.

The melt index a of the fluorine-containing polymer of the present embodiment, which is correlated with the molecular weight of the fluorine-containing polymer, can be adjusted by means of the amount of the polymerization initiator or the chain transfer agent to be added on polymerization. Generally, the higher the molecular weight, the lower the melt index a of the fluorine-containing polymer.

The thermal stability of the fluorine-containing polymer of the present embodiment is an index required on melt membrane formation by a coextrusion T die method or the like.

The molecular weight of a fluorine-containing polymer having low thermal stability tends to increase by a T die method or the like due to heat hysteresis. As the molecular weight increases, the melt viscosity of the fluorine-containing polymer increases over time, and thus, membrane formation unevenness occurs. A membrane in which membrane formation unevenness has occurred has an inhomogeneous membrane thickness, and has the problem of an increase in the voltage on electrolysis in a portion of a thick membrane thickness when the fluorine-containing polymer of the present embodiment is used as a cation exchange membrane. When the membrane thickness is inhomogeneous, the voltage itself is likely to be inhomogeneous. From the viewpoint of suppressing occurrence of membrane formation unevenness, a higher thermal stability of the fluorine-containing polymer is preferred.

Here, the melt index (MI) (unit: g/10 minutes) of the fluorine-containing polymer measured under conditions of a temperature of 275° C., a load of 2.16 kg, and an orifice inner diameter of 2.09 mm, in accordance with JIS K-7210, is taken as b. Meanwhile, after the fluorine-containing polymer is left to stand in the air under a 275° C. environment for 60 minutes, the melt index (MI) (unit: g/10 minutes) of the fluorine-containing polymer measured under conditions of a temperature of 275° C., a load of 2.16 kg, and an orifice inner diameter of 2.09 mm is taken as c. In the fluorine-containing polymer having poor thermal stability, the molecular weight increases due to heat hysteresis and the melt viscosity also increases. Thus, a value obtained by dividing c by b (c/b) lowers.

c/b takes a value of 0<c/b, and the thermal stability of the fluorine-containing polymer can be evaluated using the c/d value.

The higher the c/b, the higher the thermal stability, and it is possible to suppress occurrence of membrane formation unevenness even when the polymer is subjected to heat hysteresis by a T die method or the like.

From the above viewpoint, $0.6 \leq c/b$ is preferred and $0.7 \leq c/b$ is more preferred in the fluorine-containing polymer of the present embodiment. The upper limit value of c/b is not particularly limited, but $c/b \leq 1$ is preferred.

The SR (swell ratio, unit:%) value of the fluorine-containing polymer of the present embodiment is preferably smaller.

A fluorine-containing polymer having a large SR is not suitable for membrane formation, and a fluorine-containing polymer having a small SR is more suitable for membrane formation. The SR herein is defined by an expression: $(d-2.09)/2.09 \times 100$. d is the diameter of a fluorine-containing polymer strand (unit:mm) when the melt index is measured under conditions of a temperature of 270° C., a load of 2.16 kg, and an orifice inner diameter of 2.09 mm, in accordance with JIS K-7210.

In the fluorine-containing polymer of the present embodiment, the SR value is preferably 50% or less, more preferably 30% or less, and even more preferably 20% or less. The SR value tends to be smaller by, for example, narrowing the molecular weight distribution.

In the present embodiment, the resistivity (Ω·cm) of the fluorine-containing polymer having a carboxylic acid-type ion exchange group and a hydrolysate of the fluorine-containing polymer having a carboxylic acid-type ion exchange group precursor is preferably lower.

The resistivity is an electrical resistivity and specifically, can be measured by a method described in the examples to be mentioned below.

When the resistivity is low, the electrical resistance of the fluorine-containing polymer becomes lower, and the electrolytic voltage on electrolysis becomes lower.

The resistivity also changes depending on the EW of the fluorine-containing polymer. The lower the EW, the lower the resistivity tends to become.

Even when the EW's of fluorine-containing polymers are the same, a fluorine-containing polymer having a hydrophilic group in the terminal structure and having a lower resistivity is preferred from the viewpoint that the electrolytic voltage can be lower when the polymer is used as a cation exchange membrane.

<Thermal Stability>

The fluorine-containing polymer of the present embodiment and a cation exchange membrane including the polymer are characterized by having high thermal stability.

The reason why the fluorine-containing polymer of the present embodiment and the cation exchange membrane have high thermal stability is not necessarily obvious, but can be assumed as follows.

When the main-chain terminal structure has a —CH$_2$OH terminal, the —CH$_2$OH terminal, on being subjected to heat hysteresis, changes into an unstable —COF terminal due to oxidation. This —COF terminal and the —CH$_2$OH terminal in the fluorine-containing polymer cause an esterification reaction to thereby increase the molecular weight. When the fluorine-containing polymer has an ester group, the —CH$_2$OH terminal and the ester group cause a transesterification reaction also to thereby increase the molecular weight. Meanwhile, the fluorine-containing polymer of the present embodiment has the main-chain terminal structure (T), that is, a terminal generated when the alcohol described above is used as the chain transfer agent (e.g., —CH(CH$_3$)OH or the like), and thus, is unlikely to cause an oxidation reaction. Additionally, a transesterification reaction is also suppressed by steric hindrance, and the polymer is stable to heat.

<Resistivity>

The fluorine-containing polymer of the present embodiment and a cation exchange membrane including the polymer are characterized by having a low resistivity.

The reason why the fluorine-containing polymer of the present embodiment and a cation exchange membrane including the polymer have a low resistivity is not necessarily obvious, but can be assumed as follows.

When the above alcohol is used as the chain transfer agent, the fluorine-containing polymer of the present embodiment has a hydroxyl group in the main chain terminal. When a hydrophilic group like hydroxyl group is contained in the main chain terminal, the conductivity of the fluorine-containing polymer rises, and the resistivity becomes lower in comparison with a fluorine-containing polymer having no hydrophilic group in the main chain terminal.

[Cation Exchange Membrane]

A cation exchange membrane has a function of allowing cations to selectively permeate therethrough and contains the fluorine-containing polymer. The cation exchange membrane of the present embodiment contains a hydrolysate of the fluorine-containing polymer of the present embodiment.

The cation exchange membrane of the present embodiment, namely the membrane main body, preferably comprises a sulfonic acid layer having sulfonic acid group as an ion exchange group and a carboxylic acid layer having a carboxylic acid group as an ion exchange group. The cation exchange membrane is usually used such that the sulfonic acid layer is disposed on the anode side of an electrolyzer and the carboxylic acid layer is disposed on the cathode side of the electrolyzer. The sulfonic acid layer is preferably constituted by a material having low electrical resistance and has a large membrane thickness from the viewpoint of membrane strength. The carboxylic acid layer preferably has a high anion exclusion property, even if having a small membrane thickness, and has low electrical resistance. Thus, the fluorine-containing polymer of the present embodiment, more specifically, a hydrolysate of the fluorine-containing polymer can be preferably applied therefor. The membrane main body should be one having a function of allowing cations to selectively permeate therethrough and containing the fluorine-containing polymer, and the structure thereof is not necessarily limited to the above structure. Here, the anion exclusion property is property to prevent infiltration and permeation of anions to cation exchange membrane.

The cation exchange membrane of the present embodiment also can be identified with the structure of the fluorine-containing polymer of the present embodiment after hydrolysis as follows. That is to say, the cation exchange membrane of the present embodiment comprises a fluorine-containing polymer comprising a tetrafluoroethylene unit (A) and a perfluoroethylene unit (B) having a carboxylic acid-type ion exchange group, wherein the fluorine-containing polymer has a main-chain terminal structure (T) represented by the following formula (1):

—$(C_mF_nH_{2m-n})$—OH  (1)

wherein m and n each represent any integer satisfying $m \geq 2$, $n \geq 0$, and $2m-n \geq 1$.

In the present embodiment, the perfluoroethylene unit (B) preferably comprises a unit (B1) represented by the following formula (2):

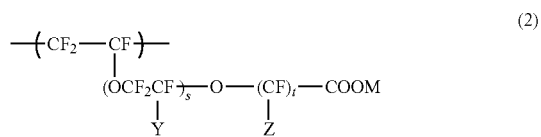

(2)

wherein s represents an integer of 0 to 2, t represents an integer of 1 to 12, Y and Z each independently represent F or $CF_3$, and M represents an alkali metal.

In the above formula (2), M is preferably K or Na, and more preferably Na. t is preferably an integer of 1 to 4, and more preferably 1 to 3.

The cation exchange membrane of the present embodiment may be the one containing a hydrolysate of the fluorine-containing polymer of the present embodiment, as described above, and hydrolysis of the fluorine-containing polymer of the present embodiment can be performed by a conventional method.

The hydrolysis is preferably performed, for example, in an aqueous solution of 2.5 to 4.0 N potassium hydroxide (KOH) and 20 to 40% by mass DMSO (dimethyl sulfoxide) at 40 to 90° C. for 10 minutes to 24 hours. Thereafter, a salt exchange treatment is preferably performed under a 50 to 95° C. condition using a 0.5 to 0.7 N caustic soda (NaOH) solution. From the viewpoint of more effectively preventing a voltage increase resulting from an excessive increase in the layer thickness, the treatment time is preferably shorter than 2 hours when the treatment temperature in the above salt exchange treatment is set to 70° C. or higher.

The cation exchange membrane of the present embodiment is preferably a laminate having a layer of a hydrolysate of the fluorine-containing polymer of the present embodiment and a layer of a hydrolysate of a sulfonic acid-type fluorine-containing polymer.

As the sulfonic acid-type fluorine-containing polymer, which is not particularly limited, various known ones can be used. The sulfonic acid-type fluorine-containing polymer also can be produced by copolymerizing the polymer further with a vinyl compound having a functional group that may be converted into a sulfonic acid group (sulfone-type ion exchange group). The vinyl compound having a functional group that can be converted into a sulfonic acid group (sulfone-type ion exchange group) is, for example, preferably a monomer represented by $CF_2$=CFO—X—$CF_2$—$SO_2F$, wherein X represents a perfluoro group.

Specific examples thereof include monomers shown below:
$CF_2$=$CFOCF_2CF_2SO_2F$,
$CF_2$=$CFOCF_2CF(CF_3)OCF_2CF_2SO_2F$,
$CF_2$=$CFOCF_2CF(CF_3)OCF_2CF_2CF_2SO_2F$,
$CF_2$=$CF(CF_2)_2SO_2F$,
$CF_2$=$CFO[CF_2CF(CF_3)O]_2CF_2CF_2SO_2F$, and
$CF_2$=$CFOCF_2CF(CF_2OCF_3)OCF_2CF_2SO_2F$ These can be used singly or in combinations of two or more thereof. Among these, $CF_2$=$CFOCF_2CF(CF_3)OCF_2CF_2SO_2F$ and $CF_2$=$CFOCF_2CF(CF_3)OCF_2CF_2SO_2F$ are more preferred.

The sulfonic acid-type fluorine-containing polymer can be produced in the same manner as for the fluorine-containing polymer of the present embodiment except that the monomer mentioned above is used.

The cation exchange membrane of the present embodiment preferably has a reinforcement core material disposed inside the membrane body. The reinforcement core material is a member that reinforces the strength and dimensional stability of the ion exchange membrane. Especially, extension and contraction of the ion exchange membrane can be controlled to a desired range by disposing the reinforcement core material inside the membrane body. The ion exchange membrane does not extend or contract excessively on electrolysis or the like and thus can maintain excellent dimension stability over a long period.

The cation exchange membrane of the present embodiment includes a material in which the carboxylic acid-type ion exchange group precursor is converted (hydrolyzed) into a carboxylic acid-type ion exchange group by immersing the membrane body containing the fluorine-containing polymer of the present embodiment and, as required, a reinforcement core material in a hydrolysis solution containing an acid or alkali to hydrolyze the group, that is, a hydrolysate of the fluorine-containing polymer of the present embodiment, and thus, can be used for electrolysis or the like.

The cation exchange membrane of the present embodiment preferably includes a continuous hole inside the membrane. The continuous hole refers to a hole that can be a flow channel for cations produced during electrolysis and for an electrolyte solution. The continuous hole, which is also a tubular hole formed inside the membrane body, is formed by dissolution of a sacrifice core material (or sacrifice yarn) by an acid or alkali used for hydrolysis of the fluorine-containing polymer. The shape, diameter, and the like of the continuous hole can be controlled by selecting the shape and diameter of the sacrifice core material (sacrifice yarn).

The cation exchange membrane of the present embodiment preferably has a coating layer of an inorganic substance for preventing attachment of gas on the surface on the cathode side and/or surface on the anode side of the membrane body. The coating layer can be formed by applying a fluid containing fine particles of an inorganic oxide dispersed in a binder polymer solution with a spray or the like.

[Electrolyzer]

The cation exchange membrane of the present embodiment can be used as a constituent of the electrolyzer. In other words, the electrolyzer of the present embodiment includes an anode, a cathode, and the cation exchange membrane of the present embodiment disposed between the anode and the cathode.

FIG. 1 shows a schematic view of one embodiment of the electrolyzer according to the present embodiment.

An electrolyzer 100 of the present embodiment includes at least an anode 200, a cathode 300, a cation exchange membrane 1 of the present embodiment disposed between the anode 200 and the cathode 300. Here, the electrolyzer 100 including the cation exchange membrane 1 described above is explained as an example, but the present embodiment is not limited thereto and can be carried out after making various modifications within the scope of the effects of the present embodiment.

While the electrolyzer 100 is usable in various types of electrolysis, the use thereof in the electrolysis of an aqueous alkali chloride solution will now be described below as a representative example.

The electrolytic conditions are not particularly limited, and electrolysis can be performed under known conditions. For example, a 2.5 to 5.5 N aqueous alkali chloride solution is supplied to the anode chamber, water or a diluted aqueous alkali hydroxide solution is supplied to the cathode chamber, and electrolysis is performed under a direct current.

The configuration of the electrolyzer of the present embodiment is not particularly limited, and may be, for example, unipolar or bipolar.

Materials constituting the electrolyzer 100 are not particularly limited, and known materials can be used. For example, the material of the anode chamber is preferably titanium or the like, which is resistant to alkali chloride and chlorine, and the material of the cathode chamber is preferably nickel or the like, which is resistant to alkali hydroxide and hydrogen.

As for the arrangement of electrodes, the cation exchange membrane 1 and the anode 200 may be disposed with a suitable space provided therebetween, but the electrolyzer may be used without any problem even if the anode 200 and the cation exchange membrane 1 are disposed in contact with each other. While the cathode is generally disposed so as to have a suitable space from the cation exchange membrane, a contact-type electrolyzer that does not have this space (a zero gap base electrolyzer) could be used without any problem.

EXAMPLES

Hereinbelow, the present embodiment will now be described in detail by way of Examples. The present invention is not limited to the following Examples.

<Thermal Stability Evaluation>

The thermal stability of the fluorine-containing polymer was evaluated by the following method.

First, a melt index (MI; g/10 minutes) b was measured under conditions of a temperature of 275° C., a load of 2.16 kg, and an orifice inner diameter of 2.09 mm in accordance with JIS K-7210. After the fluorine-containing polymer was left to stand in the air under a 275° C. environment for 60 minutes, a melt index (MI; g/10 minutes) c was measured under conditions of a temperature of 275° C., a load of 2.16 kg, and an orifice inner diameter of 2.09 mm. When the value obtained by dividing c by b (c/b) was c/b≥0.6, the thermal stability was considered to be good, and when the value was c/b<0.6, the thermal stability was considered to be poor.

<SR Measurement>

The swell ratio (SR; %) of the fluorine-containing polymer was calculated by "(d−2.09)/2.09×100".

Here, d was the diameter of a fluorine-containing polymer strand (unit: mm) on measuring the melt index under conditions of a temperature of 270° C., a load of 2.16 kg, and an orifice inner diameter of 2.09 mm in accordance with JIS K-7210.

A fluorine-containing polymer with SR>50% was considered not to be suitable for membrane formation.

<Resistivity Measurement>

The resistivity of the fluorine-containing polymer was measured as follows.

First, 0.6 g of a fluorine-containing polymer having a carboxylic acid-type ion exchange group precursor was subjected to thermal pressing at 270° C. and formed into a membrane of about 150 μm. This membrane was saponified by immersion in an aqueous solution containing 30% by mass of dimethyl sulfoxide (DMSO) and 15% by mass of potassium hydroxide (KOH) at 80° C. for 30 minutes, and then immersed in a 0.5 N sodium hydroxide aqueous solution at 50° C. for 80 minutes to thereby substitute the ion exchange group by a $CO_2Na$ type.

The membrane after the substitution was immersed in water for 18 hours, then transferred into a 0.1 N sodium hydroxide aqueous solution, and immersed therein for 18 hours.

Next, the membrane was placed in a measurement cell filled with a 0.1 N sodium hydroxide aqueous solution at 25° C. and sandwiched between platinum electrodes having an effective conducting area of 1 $cm^2$. Then, a low resistivity meter 3566 having a measurement frequency of 1 kHz (manufactured by Tsuruga Electric Corporation) was used to measure the resistance value $R_1$ (Ω).

Subsequently, after the membrane sandwiched between the platinum electrodes was removed, the resistance value $R_2$ of liquid resistance (Ω) was measured.

The membrane thickness L (cm) of the removed membrane was also measured with a thickness gauge.

The resistivity $R_M$ (Ω·cm) was determined by an expression: $R_M=(R_1-R_2)\times 1$ $(cm^2)/L$.

Example 1

(Production of Fluorine-Containing Polymer)

Solution polymerization was performed in order to obtain a carboxylic acid-type fluorine-containing polymer.

The stirring blade used was anchor-shaped. First, 561.5 g of $CF_2=CFOCF_2CF(CF_3)O(CF_2)_2COOCH_3$ and 561.5 g of HFC-43-10mee were introduced into a 1 L stainless steel autoclave, and the autoclave was fully replaced with nitrogen, then further replaced with $CF_2=CF_2$ (tetrafluoroethylene; TFE), heated until the temperature inside the autoclave became stable at 25° C., and pressurized by TFE to 0.411 MPa-G (gauge pressure). Then, 4.49 g of a 5% HFC43-10mee solution of $(CF_3CF_2CF_2COO)_2$ as a polymerization initiator and 0.059 g of ethanol as a chain transfer agent were introduced therein to start the reaction. The TFE was intermittently fed while stirring at 25° C., 0.059 g of ethanol was added during the process to lower the TFE pressure from 0.411 MPa-G at the initial stage to 0.387 MPa-G at the end, and after 2.5 hours, 14 mL of methanol was added to terminate the polymerization. After unreacted TFE was discharged to the outside of the system, the liquid was removed by heating the resulting polymerization liquid and subjecting the liquid to pressure reduction to thereby obtain 68 g of a fluorine-containing polymer.

The resulting fluorine-containing polymer was kneaded in a LABO PLASTOMILL (model 4M150) of Toyo Seiki Seisaku-sho, Ltd. at a temperature of 260° C. and the number of revolutions of the blade of 50 rpm for 20 minutes. Thereafter, the EW (equivalent weight) of the fluorine-containing polymer was determined by neutralization titration, and the EW was 1152 g/eq.

The MI (melt index) of the above fluorine-containing polymer was measured using a MELT INDEXER F-F01 of Toyo Seiki Seisaku-sho, Ltd.

The melt index a measured under conditions of a temperature of 270° C., a load of 2.16 kg, and an orifice inner diameter of 2.09 mm, in accordance with JIS K-7210 was 12.0 (g/10 minutes).

When c/b was determined from the melt index b measured under conditions of a temperature of 275° C., a load of 2.16 kg, and an orifice inner diameter of 2.09 mm in accordance with JIS K-7210 and the melt index c measured, after the fluorine-containing polymer was left to stand in the air under a 275° C. environment for 60 minutes, under conditions of a temperature of 275° C., a load of 2.16 kg, and an orifice inner diameter of 2.09 mm, c/b was 0.91 and the thermal stability was good.

The result of the SR measurement of the above fluorine-containing polymer was 15.9%.

The result of the resistivity measurement of the above fluorine-containing polymer was 208 ($\Omega \cdot cm$).

Example 2

From the conditions of Example 1, the chain transfer agent was changed to n-propanol, the amount of n-propanol added at the initial stage was changed to 0.079 g, and the amount of n-propanol added during the process was changed to 0.079 g.

The TFE pressure was reduced from 0.413 MPa-G at the initial stage to 0.389 MPa-G at the end. The polymerization was performed in the same manner as in Example 1 except for the foregoing, and 14 mL of methanol was added after 2.9 hours to terminate the polymerization. After unreacted TFE was discharged to the outside of the system, the liquid was removed by heating the resulting polymerization liquid and subjecting the liquid to pressure reduction to thereby obtain 75 g of a fluorine-containing polymer.

The resulting fluorine-containing polymer was kneaded in a LABO PLASTOMILL (model 4M150) of Toyo Seiki Seisaku-sho, Ltd. at a temperature of 260° C. and the number of revolutions of the blade of 50 rpm for 20 minutes. Thereafter, the EW of the fluorine-containing polymer was measured, and the EW was 1152 g/eq.

The melt index a of the above fluorine-containing polymer was 12.0 (g/10 minutes). When the melt index b and the melt index c were measured and c/b was determined for thermal stability evaluation, c/b was 0.89, and the thermal stability was good.

The result of the SR measurement of the above fluorine-containing polymer was 16.3%.

The result of the resistivity measurement of the above fluorine-containing polymer was 208 ($\Omega \cdot cm$).

Comparative Example 1

From the conditions of Example 1, the chain transfer agent was changed to methanol, the amount of methanol added at the initial stage was changed to 0.264 g, and the amount of methanol added during the process was changed to 0.264 g. The TFE pressure was reduced from 0.413 MPa-G at the initial stage to 0.389 MPa-G at the end. The polymerization was performed in the same manner as in Example 1 except for the foregoing, and 14 mL of methanol was added after 2.6 hours to terminate the polymerization. After unreacted TFE was discharged to the outside of the system, the liquid was removed by heating the resulting polymerization liquid and subjecting the liquid to pressure reduction to thereby obtain 75 g of a fluorine-containing polymer.

The resulting fluorine-containing polymer was kneaded in a LABO PLASTOMILL (model 4M150) of Toyo Seiki Seisaku-sho, Ltd. at a temperature of 260° C. and the number of revolutions of the blade of 50 rpm for 20 minutes. Thereafter, the EW of the fluorine-containing polymer was measured, and the EW was 1152 g/eq.

The melt index a of the above fluorine-containing polymer was 12.0 (g/10 minutes). When the melt index b and the melt index c were measured and c/b was determined for thermal stability evaluation, c/b was 0.48, and the thermal stability was poor.

The result of the SR measurement of the above fluorine-containing polymer was 15.8%.

The result of the resistivity measurement of the above fluorine-containing polymer was 208 ($\Omega \cdot cm$).

Comparative Example 2

From the conditions of Example 1, the chain transfer agent was changed to propane, the amount of propane added at the initial stage was changed to 0.07 g, and the amount of propane added during the process was changed to 0.07 g. The TFE pressure was reduced from 0.421 MPa-G at the initial stage to 0.396 MPa-G at the end. The polymerization was performed in the same manner as in Example 1 except for the foregoing, and 14 mL of methanol was added after 4 hours to terminate the polymerization. After unreacted TFE was discharged to the outside of the system, the liquid was removed by heating the resulting polymerization liquid and subjecting the liquid to pressure reduction to thereby obtain 73 g of a fluorine-containing polymer.

The resulting fluorine-containing polymer was kneaded in a LABO PLASTOMILL (model 4M150) of Toyo Seiki Seisaku-sho, Ltd. at a temperature of 260° C. and the number of revolutions of the blade of 50 rpm for 20 minutes. Thereafter, the EW of the fluorine-containing polymer was measured, and the EW was 1149 g/eq.

The melt index a of the above fluorine-containing polymer was 14.1 (g/10 minutes). When the melt index b and the melt index c were measured and c/b was determined for thermal stability evaluation, c/b was 0.87, and the thermal stability was good.

The result of the SR measurement of the above fluorine-containing polymer was 13.9%.

The result of the resistivity measurement of the above fluorine-containing polymer was 212 ($\Omega \cdot cm$), and the resistivity was higher than that of Examples 1 and 2.

Comparative Example 3

From the conditions of Example 1, the chain transfer agent was changed to n-heptane, the amount of n-heptane added at the initial stage was changed to 0.112 g, and the amount of n-heptane added during the process was changed to 0.112 g. The TFE pressure was reduced from 0.413 MPa-G at the initial stage to 0.389 MPa-G at the end. The polymerization was performed in the same manner as in Example 1 except for the foregoing, and 14 mL of methanol was added after 3.9 hours to terminate the polymerization. After unreacted TFE was discharged to the outside of the system, the liquid was removed by heating the resulting polymerization liquid and subjecting the liquid to pressure reduction to thereby obtain 57 g of a fluorine-containing polymer.

The resulting fluorine-containing polymer was kneaded in a LABO PLASTOMILL (model 4M150) of Toyo Seiki Seisaku-sho, Ltd. at a temperature of 260° C. and the number of revolutions of the blade of 50 rpm for 20 minutes. Thereafter, the EW of the fluorine-containing polymer was measured, and the EW was 1145 g/eq.

The melt index a of the above fluorine-containing polymer was 13.2 (g/10 minutes). When the melt index b and the melt index c were measured and c/b was determined for thermal stability evaluation, c/b was 0.88, and the thermal stability was good.

The result of the SR measurement of the above fluorine-containing polymer was 98.0%, and the fluorine-containing polymer was not suitable for membrane formation.

The result of the resistivity measurement of the above fluorine-containing polymer was 213 (Ω·cm), and the resistivity was higher than that of Examples 1 and 2.

INDUSTRIAL APPLICABILITY

The fluorine-containing polymer of the present invention has industrial applicability as a material of cation exchange membranes for use in alkali chloride electrolysis or the like. The cation exchange membrane of the present invention has industrial applicability as a cation exchange membrane for use in alkali chloride electrolysis or the like.

REFERENCE SIGNS LIST

1 Cation exchange membrane
100 Electrolyzer
200 Anode
300 Cathode

The invention claimed is:

1. A cation exchange membrane comprising:
a fluorine-containing polymer comprising a tetrafluoroethylene unit (A) and a perfluoroethylene unit (B) having a carboxylic acid-type ion exchange group,
wherein the fluorine-containing polymer has a main-chain terminal structure (T) represented by the following formula (1):

 (1)

wherein m and n each represent any integer satisfying $m \geq 2$, $n \geq 0$, and $2m-n \geq 1$.

2. The cation exchange membrane according to claim 1, wherein the perfluoroethylene unit (B) comprises a unit (B1) represented by the following formula (2):

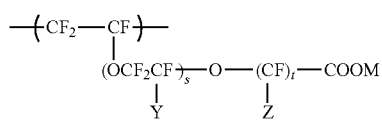 (2)

wherein s represents an integer of 0 to 2, t represents an integer of 1 to 12, Y and Z each independently represent F or $CF_3$, and M represents an alkali metal.

3. A fluorine-containing polymer comprising:
a tetrafluoroethylene unit (A); and
a perfluoroethylene unit (b) having a carboxylic acid-type ion exchange group precursor,
wherein the fluorine-containing polymer has a main-chain terminal structure (T) represented by the following formula (1):

 (1)

wherein m and n each represent any integer satisfying $m \geq 2$, $n \geq 0$, and $2m-n \geq 1$.

4. The fluorine-containing polymer according to claim 3, wherein the perfluoroethylene unit (b) having the carboxylic acid-type ion exchange group precursor comprises a unit (b1) represented by the following formula (3):

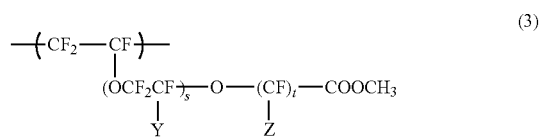 (3)

wherein s represents an integer of 0 to 2, t represents an integer of 1 to 12, and Y and Z each independently represent F or $CF_3$.

5. A method for producing the fluorine-containing polymer according to claim 3, comprising performing a polymerization using a chain transfer agent comprising an alcohol represented by the following formula (4):

 (4)

wherein m and n each represent any integer satisfying $m \geq 2$, $n \geq 0$, and $2m+1-n \geq 1$.

6. A method for producing the fluorine-containing polymer according to claim 3, comprising performing a polymerization using a chain transfer agent comprising at least one alcohol selected from the group consisting of ethanol, n-propanol, and 2-propanol.

7. A cation exchange membrane comprising a hydrolysate of the fluorine-containing polymer according to claim 3.

8. An electrolyzer comprising:
an anode;
a cathode; and
the cation exchange membrane according to claim 1 disposed between the anode and the cathode.

9. A method for producing the fluorine-containing polymer according to claim 4, comprising performing a polymerization using a chain transfer agent comprising an alcohol represented by the following formula (4):

 (4)

wherein m and n each represent any integer satisfying $m \geq 2$, $n \geq 0$, and $2m+1-n \geq 1$.

10. A method for producing the fluorine-containing polymer according to claim 4, comprising performing a polymerization using a chain transfer agent comprising at least one alcohol selected from the group consisting of ethanol, n-propanol, and 2-propanol.

11. A cation exchange membrane comprising a hydrolysate of the fluorine-containing polymer according to claim 4.

12. An electrolyzer comprising:
an anode;
a cathode; and
the cation exchange membrane according to claim 2 disposed between the anode and the cathode.

13. An electrolyzer comprising:
an anode;
a cathode; and
the cation exchange membrane according to claim 7 disposed between the anode and the cathode.

* * * * *